Aug. 20, 1968     E. GROSCHWITZ     3,398,294
SOLID STATE STIMULATED RAMAN EFFECT AMPLIFYING SYSTEM
Filed Aug. 27, 1964     5 Sheets-Sheet 1

Aug. 20, 1968     E. GROSCHWITZ     3,398,294
SOLID STATE STIMULATED RAMAN EFFECT AMPLIFYING SYSTEM
Filed Aug. 27, 1964     5 Sheets-Sheet 2
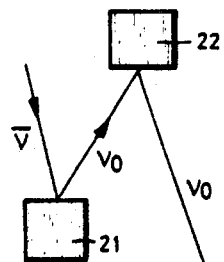
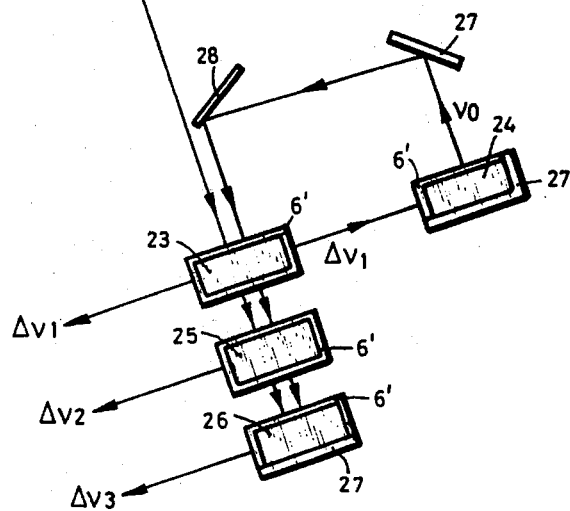
Fig. 4
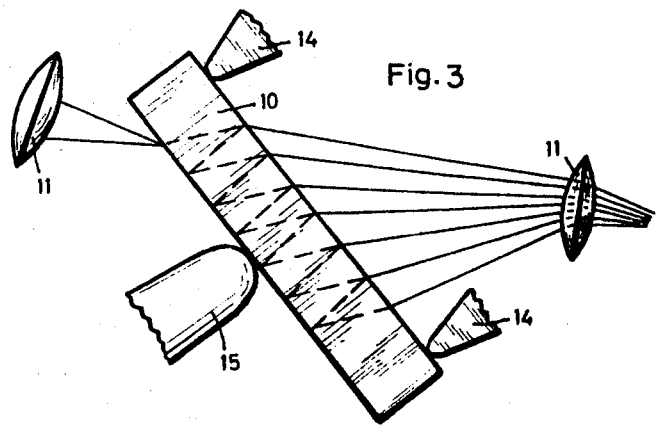
Fig. 3

Aug. 20, 1968  E. GROSCHWITZ  3,398,294
SOLID STATE STIMULATED RAMAN EFFECT AMPLIFYING SYSTEM
Filed Aug. 27, 1964  5 Sheets-Sheet 4
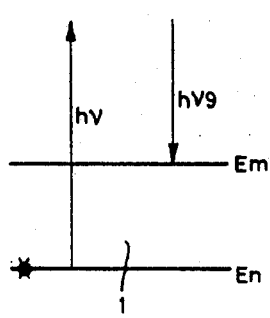
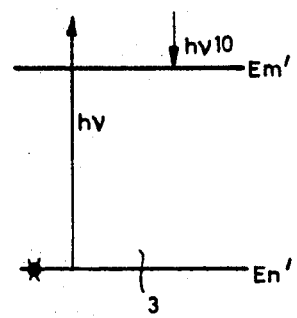
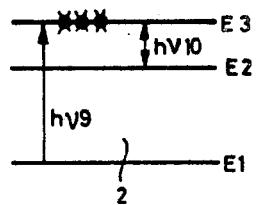
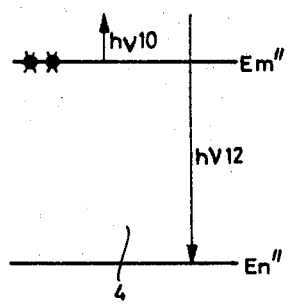
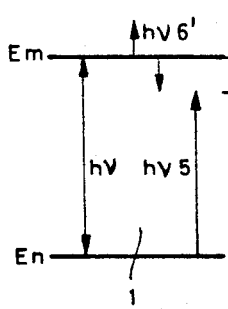
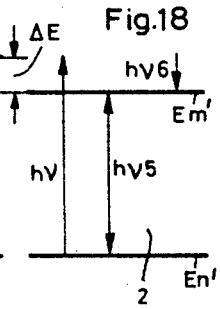
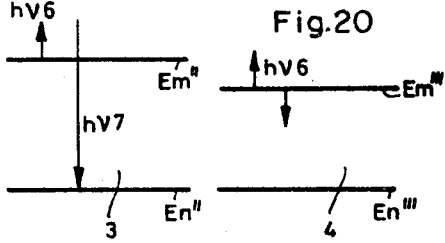

United States Patent Office 3,398,294
Patented Aug. 20, 1968

3,398,294
SOLID STATE STIMULATED RAMAN EFFECT
AMPLIFYING SYSTEM
Eberhard Groschwitz, Munich, Germany, assignor to
Siemens Aktiengesellschaft, a corporation of Germany
Filed Aug. 27, 1964, Ser. No. 393,012
Claims priority, application Germany, Aug. 30, 1963,
S 87,019, S 87,020, S 87,021
32 Claims. (Cl. 307—88.3)

ABSTRACT OF THE DISCLOSURE

A system for stimulating emission of electromagnetic radiation comprises a number of resonant component systems. Each of the resonant component systems has an active crystal, preferably of semiconductor material, in which the natural quantum-mechanical oscillatory states of the crystal-lattice corpuscles are excited. The application of primary excitation, such as primary radiation, to each crystal produces combination frequencies whose magnitude corresponds to the sum or difference of primary frequency radiation and natural frequency. The combination radiation of one component system is applied as primary radiation to the next component system for producing therein a new combination radiation.

---

My invention relates to solid-state systems for stimulated emission of electromagnetic radiation for such purposes as amplification, generation of oscillations, or transmission of radiation signals.

In accordance with the present invention, an optically coupled crystal system includes at least two crystals for the production and amplification of arbitrarily selected optical frequencies of high radiation intensity by utilizing a stimulated Raman scattering. The crystals utilized may comprise, for example, semiconductor crystals, such as $A^{III}B^V$ components, which may be optically coupled with laser-active crystals.

In order that the present invention may be readily carried into effect, it will now be described with reference to the accompanying drawings, wherein:

FIG. 3 is a schematic diagram of a modification of part of the embodiment of FIG. 2;

FIG. 4 is a schematic diagram of still another embodiment of the system of the present invention for the stimulated emission of radiation;

FIGS. 13, 14, 15 and 16 are energy level diagrams for another mode of operating a system of four components, as is the embodiment of FIG. 2;

FIGS. 17, 18, 19 and 20 are energy level diagrams for a mode of operating systems of four components in which the energy differences between the crystal oscillation states differ by the same amount from crystal to crystal.

Figure 1:
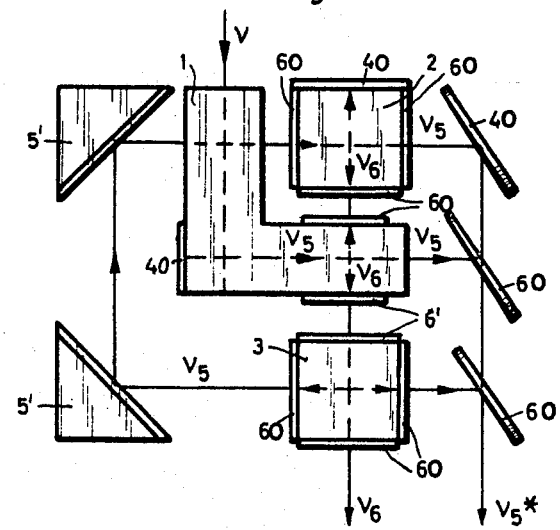
FIG. 1 is a schematic diagram of an embodiment of the system of the present invention for the stimulated emission of radiation.

It is an object of my invention to provide a solid-state amplifier on the principle of stimulated emission of radiation (maser or laser) which affords generating or amplifying frequencies other than the natural oscillation frequency, i.e., determined by the lattice structure, of an active crystal, thus permitting an operation at frequencies or in frequency bands that can be selected within relatively wide limits.

Another object, subsidiary to the one mentioned, is to provide a multistage amplifier in which the amplification takes place in a system composed of several component crystal systems operating in sequence or cascade, and in which the effective electromagnetic radiation field, during the entire stepwise or cascaded amplification performance, will take place substantially within the system of crystals, whereas the external or ambient space is accessible only at the localities of the over-all system where the radiation output issues from the system or, as the case may be, where primary radiation to be amplified enters into the over-all system.

Still another object of the invention is to devise a maser or laser crystal system in which the effect of Raman scattering is utilized for intensity amplification, particularly in order to provide for high intensities of activation in the infrared region of the radiation spectrum.

A further object of the invention is to provide a maser or laser system which is capable of satisfactory operation without the requirement for extremely low temperatures so as to permit, for example, an operation at normal room temperature for any prolonged periods of time.

According to the invention, a system for stimulating emission of electromagnetic radiation is composed of a number of resonant component systems, each having an active crystal, preferably of semiconductor material, in which the natural quantum-mechanical oscillatory states of the crystal-latice corpuscles (atoms or molecules) are excited and the application of primary excitation, such as primary radiation, produces combination frequencies whose magnitude corresponds to the sum or difference of primary-frequency radiation and natural frequency; the combination radiation of one component system being applied as primary radiation to the next component system for producing therein a new combination radiation.

The natural frequencies of the component systems constitute oscillation frequencies of the molecular oscillations of the crystal lattice. These oscillation frequencies may be excited by electromagnetic oscillations (radiation) acting from the outside upon the crystal of an individual component system, or they may be excited by mechanical oscillations applied from the outside. Also applicable are thermal excitation or excitation by an electrical field, as will be more fully explained hereinafter.

The number of the excited oscillatory states increases with temperature in accordance with a known law. For that reason, the intensity of the so-called violet component in the spectrum of the combined radiation increases when the temperature increases. Preferably therefore, and in accordance with another feature of the invention, this phenomenon is utilized in the excitation of the component systems, for example by maintaining a suitable temperature plan such as a given temperature between the respective crystals.

In general, the natural frequencies of the molecular oscillations, determined by the molecular structure, are located in the infrared region of the spectrum. The use of combination frequencies makes it possible to act upon desired frequencies below or above the infrared region. The scattering radiation, at constant frequency, is coherent with the primary radiation. For that reason, the amplification in a component system according to the invention is coherent in those component systems in which the primary radiation at constant frequency is coherently scattered. Scattered radiation at variable frequency is not coherent with the primary radiation. Therefore, a non-coherently scattered frequency is coherently scattered in a neighboring component system with the same frequency, this neighboring system being optically or acoustically excited for amplifying this component frequency (further reference to such excitation will be made in the following with reference to FIGS. 1 to 4). According to the invention, the combination radiation is radiated into the neighboring component system where it is coherently scattered or reflected. As a result, the combination radiation of a desired, given frequency coming from different component systems is collected in a given component system on the interferometer principle as a coherent radiation field, and is amplified by excitation of this collecting component system (this being the case in the embodiment shown in FIGS. 2 and 3 described hereinafter). The adaptation of the natural frequency of the coherently scattering system to a combination frequency of the neighboring system can be effected, for example, by deformation of the crystal lattice (such as by mechanical means as exemplified in FIG. 3 and described below).

The production of new frequencies by combination radiation comes about by the excitation of molecular oscillations in the component systems of the over-all system. The combination frequencies resulting from the mutual effect of these oscillations and the radiation field radiated into the component system, are coherently amplified in this or further component systems.

However, according to another way of realizing the invention, use is made of the fixed natural frequencies that do not stem from the molecule oscillations, particularly the fixed natural frequencies corresponding to excited energy states of paramagnetic foreign ions or ferromagnetic iron compounds. Suitable ferromagnetic iron compounds applicable as active crystals for such purposes are those of the garnet class. These garnet crystals are accommodated as laser-active component systems within the total system. Materials of this kind are particularly well suitable for operation in long-wave infrared regions of the spectrum.

According to another feature of the invention, freely selective frequencies, independent of the natural frequencies fixedly determined by properties of the material in the component systems, are amplified by combination radiation which results from the interaction of primary input radiation having any desired frequency with the excited molecular oscillations of at least one of the component systems.

According to a further feature, the frequency (or frequencies) of the primary radiation is so chosen that the frequency (or frequencies) of the resulting combination radiation corresponds at least partially to the natural frequencies of adjacent component systems or is at an integral ratio thereto.

Figure 2:
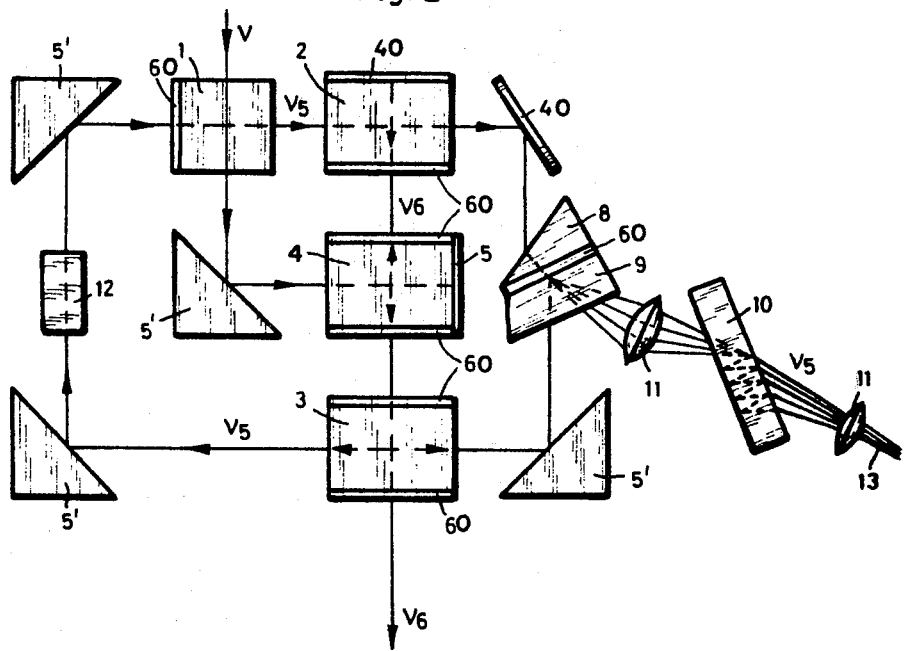
FIG. 2 is a schematic diagram of another embodiment of the system of the present invention for the stimulated emission of radiation.

As exemplified in FIGS. 1, 2 and 4, the geometric arrangement of adjacent component systems is preferably such that the over-all system has an uninterrupted radiation path and the coupling of the two component systems with respect to the radiation field to be amplified is effected by combination radiation.

For producing a coherently scattering amplification of a combination radiation at a selective frequency, the adjacent component system is chosen to possess at least one natural frequency which corresponds to that of the combination radiation supplied from the preceding component system and not coherent with the primary radiation of the latter system, so that the combination radiation is amplified in the adjacent component system.

Preferably, the maser- or laser-active crystals of the respective component systems are so chosen or biased that the natural frequency of a coherently scattering and amplifying component system differs only slightly from the combination frequency radiated from a neighboring component system, because this permtis producing relatively low frequencies by difference formation.

Such slight differences between the natural frequencies are readily obtainable by employing respective crystals of the same material and producing the difference in natural frequency by subjecting at least one of them to deformation. This can be done, for example, by means of mechanical pressure points, clamps or blades such as shown at 14 and 15 in FIG. 3.

According to one way of embodying a system of the invention, the required excitation of given energy states or oscillatory states in component systems which coherently scatter and/or amplify one or more signal frequencies in response to a combination radiation received from another component system, is effected by radiating primary radiation into the scattering or amplifying component system from the outside at a suitable frequency or frequencies. In other words, the component systems which constitute neighboring systems and receive combination radiation to coherently scatter and/or amplify signal frequencies, may receive pumping energy from their own primary radiation.

According to another way of embodying the invention, the system is so designed that, relative to the frequency range of interest to the amplification, the individual component systems are oriented in a given geometrical arrangement and are so chosen that the dispersion properties of their respective crystals are adapted to the particular radiation path determined by the required electromagnetically radiative interaction of the component systems. This is the case in the embodiment shown in FIG. 4 still to be described.

If permeability (transparency) is required, the crystals must not possess abnormal dispersion of the frequency range of operation. However, if reflection is required, the crystals must exhibit abnormal dispersion in this particular frequency range.

The above-mentioned component systems and crystals need not necessarily constitute separate structural units. Individual component systems may also be designed as thin layers embedded between the boundary faces of adjacent component systems.

According to another feature of the invention, layers of different character may be interposed between individual component systems, these layers having selective properties as regards their effect upon given frequencies, for example polarizing or double-refracting properties.

Systems according to the invention may be further equipped with force-transmitting means which, by deforming the crystalline lattice under the effect of external mechanical forces, modify the optical properties of a component system. Such force-transmitting means may be constituted by ponits, clamps or blades similar to those mentioned above (FIG. 3) and may be provided with adjusting means, such as pressure screws, for securing an independent action of the external mechanical forces upon the individual component systems.

In other embodiments of systems according to the invention, the component systems which coherently scatter and/or amplify signal frequencies from neighboring systems are excited by radiating into the amplifying system a combination radiation from adjacent component systems having a matched frequency.

In one or more of the component systems the crystal may consist of semiconductor material having predominantly valance bonds, preferably of homopolar crystals such as germanium or silicon. Also applicable as material for one or more of the crystals in the system are semiconducting ion crystals, for example of $A^{III}B^V$ semiconductor compounds, having heteropolar or mixed bonding character. One or more of the component systems may also consist of a monocrystal of a semiconducting element having a high dopant concentration of paramagnetic ions, or of a molecule crystal having predominantly a Van der Waals bonding character, for example an organic semiconductor crystal. Also applicable are magnetic compounds whose spin systems exhibit inherent frequencies which correspond to given combination frequencies of other component systems. These magnetic compounds may be selected for example from the above-mentioned garnet group.

For operation in the visible region of the spectrum, the crystals preferably consist of gallium arsenide. Most of the other semiconducting substances are applicable for frequency ranges in the infrared region. The individual materials can be readily selected on the one hand in accordance with the position of their absorption edge and, on the other hand, with reference to the absorption lines or bands determined by the lattice oscillations. For operation in the infrared region, it is preferable to employ semiconductors having predominantly ionic bonds, for example indium arsenide or indium antimonide. Semiconductor substances, such as germanium or silicon, that are doped with paramagnetic ions, are applicable as active intermediate stages of the crystal system, especially for operation in long-wave regions. For example, laser-active silicon doped with arsenic or p-doped silicon can thus be employed. With a dopant concentration of approximately $10^{17}$ atoms per cm.$^3$ of such a silicon crystal, the natural oscillation is 9 mc./sec. Other suitable materials for example are $MnSiF_5 \cdot 6H_2O$, gadolinium-ethylsulfate $Ga(C_2H_5 \cdot SO_4)_3 \cdot 9H_2O$ lanthanum - ethylsulfate $La (C_2H_5 \cdot SO_4)_3 \cdot 9H_2O$, or potassium-chrome-cyanide.

The invention will be further described with reference to the apparatus illustrated in FIG. 1.

The laser system of this apparatus comprises three component systems having respective crystals 1, 2 and 3. Pumping radiation which may have an arbitrarily chosen frequency $v$ is radiated into the L-shaped crystal 1. The frequency $v$ is assumed to be in the visible portion of the spectrum, for example. The radiation path is indicated by broken lines. These are assumed to be located in the center axis of the radiation beam and represent the direction of maximal intensity. The lateral limitation of the radiation path and its branches is conventionally defined by diaphragms and lenses (not shown).

The crystals 1, 2 and 3 are of the same material and constitution. They are transparent in the frequency ranges to be used, with the exception of the range of abnormal dispersion at the resonance frequency $v_{mn}$. Suitable, for example, are ion crystals such as GaAs monocrystals. For frequencies in the long-wave infrared region, monocrystals of InAs or InSb may be employed. As a rule, any crystals are suitable which exhibit no, or only relatively weak, absorption between the ultraviolet and the infrared regions. The crystals should be as pure as feasible. Absolute purity, however, is not necessary. Doping of the crystals is not essential because the present invention involves the utilization of oscillatory states. Essention, however, is the existence of a resonance frequency $v_{mn}$ of the employed crystals 1, 2 and 3. That is, the crystals must have oscillatory states whose resonance frequencies are located in the infrared region. These oscillation frequencies in the individual crystals are distributed predominantly between long-wave and short-wave infrared radiation.

In principle, the individual crystals are designed as resonators for the amounts of radiation that become effective in the respective crystals. For this purpose, the boundary faces of the crystals are provided with semitransparent or also with fully reflective boundary films or coatings. In a mutually intersecting radiation path, as shown in FIG. 1, the reflecting boundary layers are so arranged that node-forming resonators come about with respect to the scattered portion of radiation as well as the radiation portion that causes the scattering.

The primary pumping radiation of the frequency $v$ excites the crystal 1 to a lower energy state $E_n$ (in accordance with the energy-level diagram shown in FIG. 9) and produces in crystal 1 a secondary radiation of the frequency $v_5 = v - v_{mn}$. Excitation of the lower energy state $E_n$ is indicative of the fact that the thermal energy of the crystal is not sufficient for exciting the higher state $E_m$ but suffices to excite all oscillatory states up to and inclusive of the energy state $E_n$, assuming that there are further, lower oscillatory states of appreciable interest to the desired performance. The generated radiation of frequency $v_5$ is issued at maximal intensity laterally out of crystal 1 and into the adjacent crystal 2.

The crystal 2 is likewise to be excited up to its lower energy state $E_n$, but the excitation in this case is higher than in crystal 1. However, the resonance frequency $v_{mn}$ is not yet excited in crystal 2. Analogously the incoming radiation frequency $v_5$ produces in crystal 2 a secondary radiation of the frequency $v_6 = v_5 - v_{mn}$. This secondary frequency $v_6$ is also radiated laterally out of the crystal 2. The original pumping frequency $v$ produces in the other leg of the angular crystal 1, as well as in the crystal 2, the same secondary radiation $v_6$. The radiation $v_6$ issuing out of crystals 1 and 2 enters into the next adjacent crystal 3.

In crystal 3 the resonance frequency $v_{mn}$ is highly excited, for example thermally. With increasing temperature, the number of oscillatory states increases in accordance with the distribution law of the Bose statistic. Due to the frequency $v_6$ radiated into the crystal 3, there is produced in this crystal a secondary radiation of the frequency $v_5 = v_6 + v_{mn}$ which laterally issues from the crystal 3.

It is an essential feature of the invention that the newly produced frequency $v_5$, which can be chosen virtually arbitrarily in the above-exemplified manner, can be amplified in intensity as may be desired by mutually radiating it into and between the component crystals. Such interradiation is afforded by mirrors or reflectors shown in FIG. 1.

For example, the radiation $v_5$ issuing from the crystal 3 with a controllable intensity is deflected by mirrors 5' and is then radiated through crystal 1 into crystal 2 in the same manner as the radiation originally generated in crystal 1 at the frequency $v_5$. Since the radiation issuing from crystal 3 can be varied in intensity by thermal or electrical excitation, the total radiation at frequency $v_5$ now occurring by superposition in the crystal 2 is determined not only by the intensity of the primary pumping radiation at frequency $v$, but partly also by the controlled intensity of the frequency $v_5$. As a consequence, the now resulting radiation $v_6$ increases its intensity with the increasing intensity of the total radiation $v_5$ in crystal 2. This increased radiation is propagated to the crystal 3 where a repetition of the above-described phenomena takes place. In this manner, the system repetitively reproduces the frequencies $v_5$ and $v_6$ and thus amplifies them to a great extent.

From the viewpoint of communication technique, this performance is comparable with an optical feedback in a parametric control system. In the relatively simple case constituted by the system of FIG. 1, the parametric control is effected in the first place only by the degree of excitation of the natural oscillations $v_{mn}$ in the crystal 3. It will be understood, however, that the mentioned optical feedback need not exclusively reside in the superposition of radiation components within the crystals 1 and 2. By applying a sufficiently high intensity of the primary radiation $v$, for example by supplying this radiation from a laser having the output frequency $v$, and also with a sufficiently high intensity of the radiation $v_5$ issuing from the crystal 3, the scattering process (Raman scattering) itself can be modified in the above-mentioned feedback occurring in the crystals 1 and 2. In the latter case, the amplification is not exclusively parametric.

In an analogous manner, the radiation of an arbitrarily chosen frequency $v$ can be used for generating and amplifying new frequencies higher than the pumping frequency radiated into the system and located in the violet or longwave ultraviolet range of the spectrum. For this purpose, for example, the crystal 3 is to be chosen from a substance different from that of the crystals 1, 2 and having a resonance frequency $v_{mn}$ considerably higher than that of crystals 1 and 2. Applicable for the crystal 3 is an ion crystal. When under such conditions a radiation emitted from crystals 1 and 2 is radiated into such a highly excited crystal 3, then a radiation is produced in crystal 3 at a frequency higher than that of the primary radiation.

For exciting the utilized oscillation states in the crystals that constitute the components of a composite system according to the invention such as the one exemplified by the embodiment described above with reference to FIG. 1 or those described hereinafter, several fundamental ways are available in principle.

(1) The simplest way of excitation is to heat the individual crystals, taking advantage of the fact that the excitation of the oscillation states, as well as the number of excited states which determines the intensity of the generated radiation, is dependent upon temperature. A variation in temperature therefore affords controlling the excitation states. Thermal excitation may be effected, for example, by providing each individual crystal (1, 2, 3) with an electrically heatable resistor connected to the crystal through an electrically insulating but heat-permeable layer. In this manner, a well-defined temperature schedule for the entire system can be realized. A disturbance of the temperature schedule by mutual radiation between crystals can be suppressed below a negligible minimum because the temperature paths are heat-insulated relative to each other.

(2) A second way of excitation is the application of electromagnetic radiation. Accordingly, an individual crystal is subjected to infrared radiation of variable or controllable intensity. The excitation in both cases is perpendicular to the plane of illustration (referring to FIG. 1 or FIGS. 2 and 3) from above or below.

(3) A third way of excitation is to apply mechanical forces to the respective crystals. For this purpose, the individual crystals are connected with a mechanism imparting to the crystal a given mechanical oscillation spectrum of sonic waves which covers the resonance frequencies of the crystal oscillatory states.

The excitation of given energy or oscillation states in the crystals of component systems which coherently scatter and/or amplify signal frequencies from neighboring systems may also be effected by means of an ultrasonic generator. The ultrasonic generator may be used to act, for example, on the crystal 12 shown in FIG. 2.

Natural oscillations in component systems according to the invention can also be produced by means of ultrasonic radiating media which are isolated from neighboring component systems at least partially by sound reflecting layers. Suitable as sound insulating medium are amorphous vapor-deposited layers or layers of ceramic material, for example.

(4) Also applicable is an electrical excitation by subjecting the crystal to an electric field between electrodes immediately adjacent or attached to the crystal at respective opposite sides thereof. A preferred way according to the invention of applying such electrical excitation is to have one of the component systems consist of a piezoelectric semiconductor crystal. The excitation is then effected by means of the above-mentioned electrodes between which an electric field is maintained. For excitation of given oscillation states in the component crystal system, electric alternating voltages of the corresponding frequency are applied, thus producing an alternating electric field between the electrodes in the crystal. When more than one component crystal is electrically excited, the respective pairs of electrodes are preferably so connected to the excitation voltages that the individual components are excited independently of each other.

(5) A further way of exciting the component crystal system is by charge-carrier injection requiring the use of p–n junction diodes such as gallium arsenide diode lasers as will be more fully explained in a later place.

In principle, the laser apparatus illustrated in FIG. 2 largely corresponds to the one described above with reference to FIG. 1, except for the following differences.

The system contains a component crystal 1 of different shape and is provided with a fourth component crystal system 4 and with an additional crystal 12 operating as a modulator. The fourth crystal system 4 is a solid-state maser or laser in which a frequency produced in the other component systems is coherently amplified to constitute a signal frequency. Another portion of the radiation from the other component systems is employed for the optical excitation of the solid-state laser 4. Consequently, the laser-active component crystal 4 is fed by component radiation with respect to its optical pumping energy, as well as relative to the signal frequency issuing from this laser. The radiation emitted by the laser-active crystal 4 functions in mutual optical cooperation with the generated and amplified radiation from the other component crystal systems, essentially in the manner explained above with reference to FIG. 1. The natural frequencies of the laser-active component, as well as the resonance frequencies of the other component crystal systems, can be controlled parametrically by external mechanical forces, for example.

The additional crystal 12 consists, for example, of piezoelectric material which is transparent in the operational frequency range and which permits varying the optical wave length of the radiation $v_5$ by piezoelectric variation of the crystal density. This can be done by bending the crystal with the aid of suitably mounted blades or points, such as those described below with reference to FIG. 3.

In this manner, the optical feedback of the frequency $v_5$, aside from producing amplitude modulation, i.e. intensity modulation, results in a phase modulation. The crystal 12, therefore, also has the function of a phase shifter.

The system shown in FIG. 2 comprises additional optical means simplified by optical prisms 8 and 9, in which the generated and amplified radiation is coherently scattered to be subsequently combined in an interferometer plate 10 to form a new coherent radiation field, and the coherence is simultaneously employed for forming a combined output beam 13. For this purpose, suitable collecting lenses 11 are provided. Further lenses and diaphragms, conventionally applicable for confining the branched radiation path, are not illustrated.

The above-mentioned use of blades and similar means for the mechanical deformation of individual crystal systems is exemplified with reference to the optical interferometer plate 10. According to FIG. 3, blades 14 fixedly mounted in mutually spaced relation on one side of the plate 10 cooperate with a displaceable point or clamp 15 located on the opposite side of the plate midway between the two blades 14. Such a blade or clamp arrangement permits modifying the optical properties, for example, changing the optical paths, modifying the oscillation states in the component crystals, or modifying the natural frequencies. Such mechanical means are applicable for component crystals involving Raman scattering, as well as for crystal systems employing laser-active materials.

Suitable as laser-active components are known solid-state lasers for example. Thus, the crystal system 4 shown in FIG. 2 may also be constituted by a p–n junction laser diode, preferably a GaAs diode. The laser diodes are excited by applying a voltage which, in the manner described presently, may be photoelectrically controlled by a component frequency of the composite system.

For this purpose, the frequency $v_6$ is used as a signal frequency and "calls" upon, or probes, the laser diode. The callable frequency range in the optical region is considerably wider than the frequency $v_6$. For operation in the infrared region a corresponding other laser device is to be employed.

The system according to FIG. 2, too, may be primarily subjected not only to a single frequency $v$, but to a group of many arbitrarily selectable frequencies which simultaneously produce in the same system many new frequencies and amplify them. A continuous frequency range may also be employed.

The embodiment shown in FIG. 4 constitutes a laser system for predominantly generating and amplifying radiation of long-wave length. The radiation frequencies are particularly situated in the long-wave infrared or in the short-wave region of the electrically utilizable spectrum. A particular advantage is the fact that optical as well as electrically accessible spectral regions in the transition between long-wave infrared and micro-wave regions can be utilized, so that in this region, too, any desired frequency can be generated and amplified.

The system of FIG. 4 is provided with a total of six resonant crystal component systems denoted by 21 to 26. The composite system may be designed, for example, as a probe. For this purpose, it is so constructed that the axis of the probe coincides with that of the radiation $v_0$ between the crystals 22 and 23.

A primary pumping radiation $v$ having a certain band width is radiated into the crystal 21. This frequency, for example, is in the short-wave infrared region. The crystal 21 is so chosen that its resonance frequency $v_0 = v_{mn}$ is within the frequency band of the pumping radiation. Consequently, the crystal 21 reflects a radiation which only slightly departs from $v_0$.

The remaining portion of the radiation serves partly for heating the crystal 21 and thus for exciting the crystal to oscillate at the resonance frequency $v_0$. The crystal may also be additionally excited by mechanical, optical or electrical means as explained in the foregoing to oscillate at the resonance frequency. The radiation reflected from crystal 21 impinges upon the crystal 22 which is of the same constitution as the crystal 21 and which is similarly excited to oscillate at the frequency $v_0$. This crystal reflects with a still higher selectivity a radiation of the frequency $v_0$. The radiation of frequency $v_0$, being in the short-wave infrared, whose intensity is predominantly determined by the primary $v$, impinges upon the crystal 23 which is of the same constitution as the crystals 21 and 22 and has the same resonance frequency $v_0$, except that this resonance frequency is modified by a freely selected, very small amount due to the effect of external forces as described. Furthermore, the crystal 23 is excited only up to a low energy state $E_n$, but not to the upper modified level $E_m$. As the frequency $v_0$ enters into the crystal 23, the slight difference just mentioned gives cause to the generation of a secondary radiation of the frequency $\Delta v_1$ which emerges laterally at maximal intensity.

An essential feature of this system is the fact that due to the variation of the resonance frequency $v_0$ artificially produced by external force, there is generated from the incoming radiation frequency in the optical infrared region a new radiation having a relatively low frequency $\Delta v_1$ in the micro-wave region or in the transition region between micro-waves and long-wave infrared.

Since the radiation $\Delta v_1$ has low intensity (the intensity in this case in proportional to $v_0^4$, and $v_0$ is already in the infrared), the generated new radiation must be amplified by utilizing the feedback principle. This is done by radiating the newly generated radiation $\Delta v_1$ into the crystal 24 which is modified in the same manner and which differs from crystal 23 only by high excitation of the upper energy level $E_m$. This excitation may be effected, for example, thermally by means of an electric heating resistor, the crystal system 24 being thermally insulated from the other component crystals.

The crystal 24 furnishes an outgoing radiation $v_0$ which by means of mirrors 27 and 28 is combined with the radiations between crystals 22 and 23. With a sufficiently high temperature of crystal 24, the intensity of the radiation $v_0$ can be appreciably increased so that now the total radiation $v_0$ in crystal 23 is not exclusively determined by the primary radiation frequency but also by the controllable excitation of crystal 24. The resultant radiation $\Delta v_1$ issues laterally out of crystal 23.

The main beam having the frequency $v_0$ and passing through the crystal 23 impinges upon the further crystals 25 and 26 whose resonance frequencies are artificially modified another very slight amount. In each of these crystals the effect explained above with reference to the crystal 23 is repeated. As a result of the mutually effective radiation of excited and non-excited radiations into the crystals, an optical feedback comes about, this however being not further illustrated in FIG. 4.

Additional auxiliary means, such as the phase shift crystal 12 and the interferometer 10 described with reference to FIG. 2, may also be used in systems of the type represented by FIG 4.

The principle explained with reference to the embodiment of FIG. 4 can be applied, for example, for producing a medical instrument in which the head of a probe, thinner than a match head, accommodates an arrangement of component crystals capable of issuing radiation of one or any desired number of selective frequencies and having a controllable intensity or controllable phase relations. Such an instrument affords treating small organs or localities in the interior of a patient's body without affecting adjacent regions.

The essential features of the above-described systems according to the invention as well as the phenomena occurring in the individual component systems and the interaction of these systems, will be further described and explained with reference to the energy-level diagrams illustrated in FIGS. 5 to 26.

FIGS. 1 to 4 of the accompanying drawings represent in principle the fundamental processes involved in the radiation phenomena occurring in individual crystal systems cooperatively interrelated in accordance with the invention.

The physical phenomena of stimulated emission of radiation, as well as suitable equipment are known as such. Material which discloses physical tests relative to stimulated Raman radiation may be found in a series of articles by Vogel and Durberger published in Electronics of Oct. 27, Nov. 3, Nov. 10 and Nov. 24, 1961; and also in the articles by Nathan and Burns, published in Electronics of Dec. 6 and 14, 1963.

Figure 5:
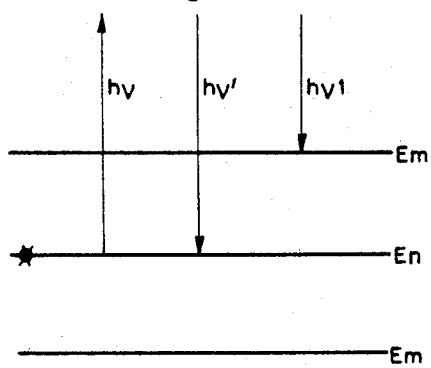
FIG. 5 is an energy level diagram for two energy states.

In FIG. 5 only two oscillatory states $E_m$ and $E_n$ are selected from all of the possible energy states of a crystal. The lower state $E_n$ is assumed to be excited thermally or by electromagnetic radiation, this being indicated by an asterisk (*) on energy level $E_n$. Assume that electromagnetic radiation of the frequency $v$ is primarily radiated into the crystal. The corresponding quantum energy is indicated by an arrow $hv'$. As a consequence of this input radiation, there results a stimulated radiation $hv$ of the same frequency $v=v'$, this being indicated by a reversed arrow $hv$ of the same length as the exciting radiation of quantum energy $hv'$. There also occurs a scattering radiation at the frequency $v_1 = v - v_{mn}$, wherein $v_{mn}$ denotes the frequency of the crystal natural oscillation corresponding to the energy difference of the two indicated energy states. During the occurrence described, the energy $E_m - E_n$ is absorbed by the crystal lattice.

Figure 6:
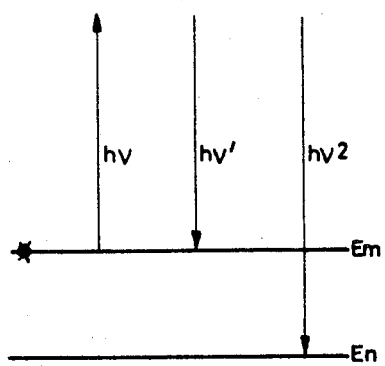
FIG. 6 is an energy level diagram for two energy states.
Figure 7:
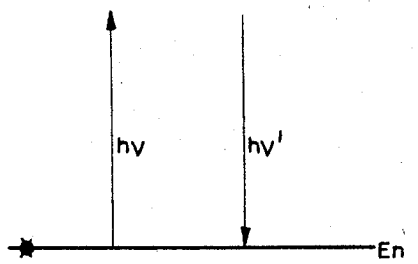
FIG. 7 is an energy level diagram for two energy states.

The diagram in FIG. 6 also shows the energy levels $E_m$ and $E_n$. Now, however, the higher energy state $E_m$ is excited, for example by heat or electromagnetic radiation. If now primary radiation $h\nu$ is radiated into the crystal, there occurs, aside from the stimulated radaition of the same frequency $\nu=\nu'$, a scattering radiation of the frequency $\nu_2=\nu+\nu_{mn}$. In this case the frequency $\nu_2$ results from the fact that the excited crystal issues the energy difference $E_m-E_n$ to the radiation field.

The diagram in FIG. 7 again shows two energy states $E_m$ and $E_n$. The oscillatory state $E_n$ is assumed to be excited, this being indicated by an asterisk on energy level $E_n$. If primary radiation $h\nu$ having a quantum energy smaller than the energy difference $E_m-E_n$ is radiated into the crystal, then a coherent scattering of the same frequency $\nu=\nu'$ occurs. It should be noted that the scattering frequencies $\nu_1$ and $\nu_2$ according to FIGS. 5 and 6 are not coherent with the primary radiation of the frequency $\nu$.

Figure 8:
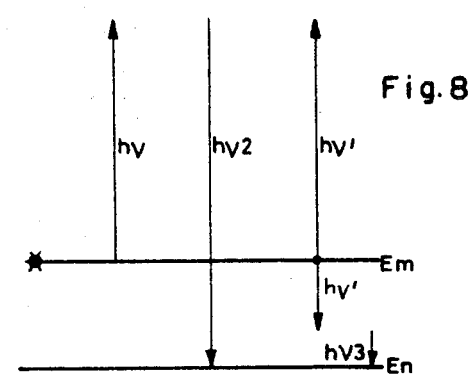
FIG. 8 is an energy level diagram for two energy states.

FIG. 8 represents the same energy levels from the energy spectrum of the crystal natural oscillations as in the preceding diagrams. The higher energy state $E_m$ is assumed to be excited, this being indicated by an asterisk on level $E_m$. When primary energy $h\nu$ is radiated into the crystal, there occurs, aside from the incoherent scattering radiation at the frequency $\nu_2$ mentioned above with reference to FIG. 6, a coherent scattering radiation at the frequency $\nu=\nu'$ and also an incoherent scattering radiation at the frequency $\nu_3=\nu_{mn}-\nu$. In this case the frequency $\nu$ of the primary radiation is lower than the frequency $\nu_{mn}$ of the crystal natural oscillations. In contrast thereto, the frequency of the primary radiation $\nu$ in the case of FIG. 5 is higher than the natural frequency $\nu_{mn}$ of the crystal lattice. The number of excited energy states increases with increasing temperature. The intensity of the scattering radiation increases with the frequency $\nu^4$ of the primary radiation radiated into the crystal.

As explained, a system according to the invention comprises a plurality of component crystal systems operating under respectively different energy conditions, such as those exemplified by the diagram shown in FIGS. 5 to 8, but in combination with each other so as to have a radiation path in common, for the purpose of obtaining an amplifying interaction. Thus the system described with reference to FIG. 1 has three such component crystal systems 1, 2, 3 correlated to each other for cooperation in this manner.

One of the above-described modes of operating the system of FIG. 1 will now be more fully explained on the basis of the phenomena discussed above with reference to FIGS. 5 to 8.

Figure 9:
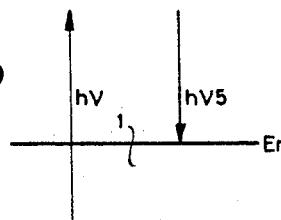
FIG. 9 is an energy level diagram for the embodiment of FIG. 1.
Figure 10:
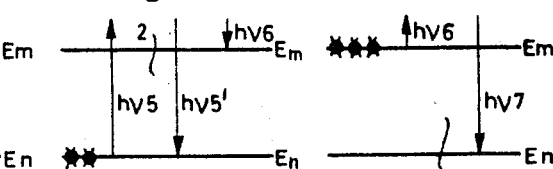
FIG. 10 is another energy level diagram for the embodiment of FIG. 1.
Figure 11:
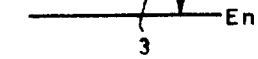
FIG. 11 is still another energy level diagram for the embodiment of FIG. 1.
Figure 12:
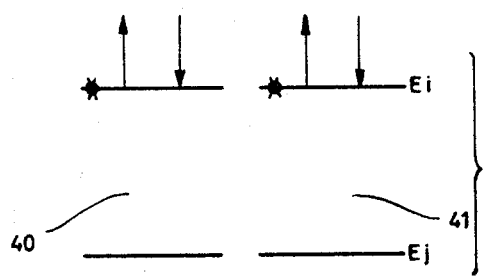
FIG. 12 is an energy level diagram for the embodiment of FIG. 2.

Relating to this mode of operation, the energy level diagrams of the three crystals denoted by 1, 2 and 3 in FIG. 1 may correspond to those shown in FIGS. 9, 10 and 11 respectively.

FIG. 9 represents two energy states $E_m$ and $E_n$ of the crystal oscillations in the component system 1. The lower energy state $E_n$ is excited, this being indicated by an asterisk. The excitation, for example, is effected by maintaining a given temperature of component system 1. Primary radiation $h\nu$ of high intensity having a frequency $\nu$ is radiated into the component system 1, resulting in the scatter radiation of the frequency $\nu_5$ according to FIG. 5. This radiation of frequency $\nu_5$ is primarily radiated into the second component system 2 of which the energy levels $E_m$ and $E_n$ are shown in FIG. 10. The radiation of frequency $\nu_5$ differs relatively little from the natural frequency $\nu_{mn}$ of component system 2, the latter frequently being a consequence of the difference between the energy states. Therefore, when the energy state $E_n$ is excited in system 2, as is indicated in FIG. 10, there occurs a scatter radiation $h\nu_6$ whose frequency $\nu_6$ is relatively low in comparison with the frequencies $\nu_5$ and $\nu$.

In component system 2, to which a correspondingly higher temperature is applied than to system 1, the lower energy state $E_n$ is more strongly excited than in system 1. Furthermore, in system 2 there is also produced a radiation of the frequency $\nu_5'$ corresponding to the frequency of the radiation entering from system 1.

The scatter radiation $h\nu_6$ of the frequency $\nu_6$, generated in the component system 2, is radiated as primary radiation into the component system 3. System 3, whose two energy states $E_m$ and $E_n$ are shown in FIG. 11, has the same natural frequency $\nu_{mn}$ as the component systems 1 and 2 in FIGS. 9 and 10 respectively. That is, the energy differences $E_m-E_n$ in the component systems 1, 2 and 3 are all of the same magnitude. However, in contrast to component systems 1 and 2, the oscillatory state of the natural frequency $\nu_{mn}$ in system 3 is excited by a given temperature which differs from the temperatures of respective systems 1 and 2, the temperature in system 3 being higher than in system 2. Accordingly, in system 3 the crystal is in the energy state $E_m$, this being indicated by *** on energy level $E_m$. For that reason, and as apparent from FIG. 11, there occurs in system 3 a scatter radiation of the frequency $\nu_7$, but now the crystal emits its excited energy into the scatter radiation at the frequency $\nu_7$. The frequency $\nu_7$ corresponds to the scattering radiation according to $\nu_2$ in FIG. 6.

It follows from the foregoing that the radiation of frequency $\nu_7$ coincides as to frequency with the radiation of frequency $\nu_5$. However, the phase relations of these component radiations $\nu_5$ and $\nu_7$ in systems 1, 2 and 3 are different. Now, the radiation frequency $\nu_7$ is radiated, back from system 3 into the systems 1 or 2; and in the systems 1 and 2 the intensity of the radiation having this frequency can be amplified within certain limits as long as system 3 is sufficiently strongly excited to provide the natural frequency $\nu_{mn}$.

Now assume that the over-all system, in accordance with the embodiment of FIG. 2, is provided with a fourth component system 4 and that system 4 is subdivided into subsystems 40, 41, 42, and so forth. Two of the subcomponent systems are represented by respective energy-level diagrams in FIG. 12. Component systems 1, 2 and 3, radiate the frequency $\nu_5=\nu_7$ into the subcomponent systems 40 and 41, etc. This radiation is converted by coherent scattering at the excited energy state $E_i$, as well as by repeated reflection at boundary faces of individual subcomponents in system 4, as a coherent radiation field for emission from the over-all system. The natural frequencies of the subcomponents in system 4 differ from the natural frequencies of the component systems 1, 2 and 3. Assume, for example, that the natural frequency $\nu_{ij}$ is considerably higher than $\nu_{mn}$. Further assume that the energy state $E_i$ in system 4 and in its subsystems are excited. The primary radiation radiated into the component system 1 at the frequency $\nu$ has a certain band width. In this manner there ultimately results a desired low-frequency radiation whose intensity can be amplified as desired by the quantum energy of the oscillatory states of component systems 2 and 3. However, the essential purpose and main function of such a system reside in the fact that in the manner described, and in contrast to conventional maser or laser systems, virtually any desired frequencies can be generated and amplified, these frequencies being different from the fixed natural frequencies of the quantum-mechanical systems constituted by the solid bodies being used.

The radiation present in the above-mentioned subsystems 40, 41, etc. is in itself coherent because only coherent scattering occurs in these subsystems. The component system 4 is to some extent analogous to an interferometer. While the crystal oscillations are assumed in the foregoing to be thermally excited, they may also be excited by electromagnetic radiation. For this purpose, the individual component systems possess respective entrances for the exciting electromagnetic radiation whose frequency must coincide with the natural frequency of the crystal oscillations. The electromagnetic radiation intended for excitation can be radiated into the component system 1 from the outside and independently of the primary frequency; as explained, however, it may also be formed in certain component systems from the primary frequency by combination radiation which is selectively applicable in adjacent component systems for excitation of the latter. In this case, a given component system must be adapted for a suitable energy distribution and corresponding energy differences, for example by choice of suitable crystal substances.

The diagrams shown in FIGS. 13 to 16 relate to still another mode of operating a system of four components. The four component crystals 1 to 4 have a common radiation path in the manner exemplified by the above-described embodiments of FIGS. 1, 2 and 4. The corresponding energy-level diagrams, also denoted by 1, 2, 3 and 4 respectively, are shown in respective FIGS. 13 to 16. The excited energy levels in the diagrams are denoted by asterisks. Two asterisks () denote a higher intensity of excitation, and three asterisks (*) a still higher intensity. Only two energy levels are selected, although each crystal may oscillate in many other energy states.

According to FIG. 13 the lower energy state $E_n$ of component crystal 1 is thermally or electrically excited. Primary radiation $hv$ of the frequency $v$ is radiated into component system 1 and produces therein the combination frequency $v_9$. The component system 1 consists of an ionic crystal such as GaAs, in special cases, however, it may also consist of a molecular crystal. The radiation $hv_9$ from component system 1 is radiated into component system 2 which does not consist of an ionic crystal but of a valence crystal such as Si or Ge strongly doped with paramagnetic ions such as As. The energy level scheme of the spin conditions of these ions is schematically represented in FIG. 15. The frequency $v_9$ produced in system 1 according to FIG. 13 is tuned to the pumping frequency corresponding to the energy states $E_3$, $E_1$ of system 2.

FIG. 14 shows two energy states of the crystal oscillations of component system 3 which, like system 1, consists of an ionic crystal or molecular crystal. The pumping energy radiated into component system 3 either has the frequency $v$ of the same primary radiation as in FIG. 13, or a new primary radiation is used. The following consideration, for example, is limited to the case in which the radiation radiated into component system 3 is constituted by the same primary radiation $hv$ as is applied to the component system 1. In component system 3 the energy states here being considered may be designated as $E_m'$ and $E_n'$. This will indicate that system 3 possesses an energy-level scheme different from that of component system 1 (FIG. 13). This difference can be obtained by selecting a crystal of different composition or in special cases also by having system 3 consist of the same crystal as the component system 1 but increasing in system 3 the difference between the energy states by compressing the crystal lattice or by applying a strong electrical field in the manner explained above. In either case, the lower energy state $E_n'$ in component system 3 is assumed to be thermally or electrically excited.

When the primary radiation $hv$ is radiated into the component system 3 (FIG. 14), radiation $hv_{10}$ is generated. The crystal of system 3 is so chosen, or the deformation of the crystal lattice is given such a magnitude, that the radiation of the frequency $v_{10}$ coincides with the oscillation to be amplified, which comes from the component system 2 in FIG. 15 and whose frequency corresponds to the energy difference between states $E_3$ and $E_2$. In component system 2, the uppermost energy level $E_3$ is sufficiently excited by the quantum energy $hv_9$ so that the relatively low frequency which corresponds to the energy levels $E_3$, $E_2$ is amplified in the conventional manner on the maser principle.

The component system 4 is represented in FIG. 16 by two energy states. System 4 also consists of an ion crystal which may be of the same constitution as the component system 1 (FIG. 13) and hence may consist of GaAs, for example. In this case the different energy spacing relative to system 1 is produced, for example, by applying external mechanical force (FIG. 3). Also applicable, however, is an ion crystal which differs from those of the component systems 1 and 3 and possesses a suitably chosen natural frequency.

In component system 4, the upper energy state of crystal oscillation is excited. In FIG. 16, this upper state is designated by $E_m''$, and the lower energy state by $E_n''$. The component system 4 receives the frequency $v_{10}$ from the component system 3 and also receives the same frequency, but amplified, from the component system 2. As a result, a scatter radiation of the frequency $v_{12}$ is generated in system 4. Depending upon the choice of the energy spacing between $E_m''$ and $E_n''$, the radiation $hv_{12}$ may coincide as to frequency with the primary radiation $hv$ or it may also coincide with the pumping frequency in component system 2. The radiation $hv_{12}$ produced in component system 4 is then either radiated back into component systems 1 and 3, or it is also radiated into system 2, whereby the intensity of the pumping-frequency radiation in system 2 is modified with respect to the radiation $hv_9=hv_{12}$, so that the excitation intensity of the energy state $E_3$ in component system 2 can be varied. This results in an intensity modulation of the radiation to be amplified having the frequency $v_{10}$ in component system 2. The stimulated emission of the radiation $hv_{10}$ in component system 2 is coherent.

Since in the systems described, the particular excitation conditions in the individual component systems control the interaction within the over-all system and jointly produce and incrementally amplify a desired combination radiation, such a system is somewhat analogous to a cascaded amplifier of the type used for radio frequencies.

The four energy-level diagrams shown in FIGS. 17 to 20 for respective four component crystal systems 1, 2, 3 and 4 relate to a characteristic case in which the energy differences between the crystal oscillation states differ by the same amount from crystal to crystal. That is, a given amount of energy, designated by $\Delta E$, occurs each time in the same manner when comparing any two adjacent component systems. The energy differences are obtained either by suitable choice of ionic crystals or by imposing upon the respective crystals external mechanical forces of different magnitudes, or by means of external electrical or magnetic fields, the application of external forces or fields being preferable for this particular purpose. If the component systems possess piezoelectric properties, these are also utilizable for obtaining the stepwise different energy-level conditions. As in the preceding energy-level diagrams, only two typical energy levels $E_m$ and $E_n$ are represented in FIGS. 17 to 20.

The component system 1 (FIG. 17) receives pumping radiation at the frequency $v$ which coincides with the natural frequency of the deformed crystal lattice, assuming that the adjustment is effected by application of external, deforming force. The primary radiation $hv$ thus excites the higher energy state $E_m$ and is completely absorbed in system 1. The same primary radiation $hv$ is radiated into component system 2 (FIG. 18) which differently deformed so that the energy difference $E_m'-E_n'$ is smaller by the amount $\Delta E$ than the corresponding energy difference in system 1.

As the primary radiation $hv$ is radiated into system 2, a combination radiation of the frequency $v_6$ is produced, and this radiation $hv_6$ is equal to the energy difference $\Delta E$. The radiation of frequency $v_6$ produced in system 2 is radiated back to component system 1 with the effect that the radiation $hv_6'$ having the frequency $v_6'$ is coherently scattered in system 1, this being symbolically indicated in the FIG. 17 by small arrows $hv_6'$ at energy level $E_m$. This feedback radiation also produces in component system 1 a radiation $h\nu_5$ at the natural frequency $\nu_5$ of component system 2. The radiation $h\nu_5$ is radiated back to system 2 whereby the excitation of the energy state $E_m'$ in system 2 is modified and increases the intensity of radiation $h\nu_6$. The energy state $E_m'$ in system 2 may also be additionally excited from the outside by radiating suitable radiation into the crystal.

The radiation $h\nu_6$ is also radiated from system 2 into component system 3 represented in FIG. 19. The higher energy state $E_m''$ is excited, for example, electromagnetically or by the action of an ultrasonic generator. The incoming radiation of energy $h\nu_6$ from component systems 1 and 2 produces in system 3 a radiation $h\nu_7$ whose frequency again coincides with the natural frequency of component system 2. Consequently this radiation, radiated from system 3 back into system 2, further modifies the excitation of the energy state $E_m'$ in system 2.

The component system 4 according to FIG. 20 is free of externally applied deformation and hence possesses its normal energy difference $E_m'''-E_n'''$. This system is likewise excited independently. Radiation of the frequency $h\nu_6$ is radiated into component system 4 from systems 1, 2 and is coherently scattered in system 4. The system 4, in reality, is composed of several parts in which the radiation field having the energy $h\nu_6$ is subjected to scattering or reflection. The radiation $h\nu_6$ in the subsystems of component system 4, not separately represented in FIG. 16, is coherent in itself; its intensity is modified and amplified in the described manner by the phenomena occurring in component systems 1, 2 and 3, as well as by the excitation degree of the energy state $E_m'''$ in component system 4.

The graduated deformation of the respective component systems places them into respectively different regions of the dispersion curve of the crystal lattice being employed. The resulting combination radiations used for excitation, are virtually fully absorbed in the regions of abnormal dispersion and can be employed for exciting the crystal oscillations of the corresponding component systems. The frequency $\nu_6$ to be amplified in the component systems is always in the region of normal dispersion.

As explained, the primary radiation according to the example last described is radiated into component systems whose natural frequencies are increased, for example by externally applied deformation, in comparison with the normal natural frequencies of the non-deformed crystal at the output end of the over-all system. In an analogous manner, the primary radiation may be radiated into a component system whose natural frequency is relatively lower, and the resulting desired frequency is then amplified and emitted from component systems having a modified, relatively high natural frequency, to issue from the output stage of the over-all system.

As mentioned above, and exemplified by the component crystal system 4 in FIG. 2, the excitation of one or more of the component systems may also be effected by means of an electric field, in which case the crystal may consist of a piezoelectric semiconductor material provided with electrodes to which an excitation voltage, such as an alternating voltage, is applied. A piezoelectric crystal may thus form any one of the component systems. For example, the geometric arrangement of the component systems may be such that the piezoelectric crystal receives combination frequencies which are radiated from neighboring systems and whose frequencies are adapted to the oscillation states peculiar to the piezoelectric crystal. The piezoelectric component may also constitute an output component which issues the combination frequencies as an amplified signal.

For exciting given natural oscillations in a piezoelectric system component, the applied electrical field oscillations must have a frequency which, at least partially, corresponds to the frequency of the induced radiation field or its combination frequency to be amplified; and, with respect to coherence of the phase distribution and relative to coincidence is given modes or frequencies of the over-all radiation system, there must exist an invariable time relation between the oscillation-exciting components of the radiation field and the induced components to be amplified. Preferably, the geometric arrangement is such as to provide for simultaneous radiation of partly non-coherent combination radiations at a given selectable frequency from several component systems into the component system that constitutes the output member of the over-all system.

The possibility of employing one or more piezoelectric crystals in the just-mentioned manner also applies to the example described presently with reference to FIGS. 21 to 26.

Figure 22:
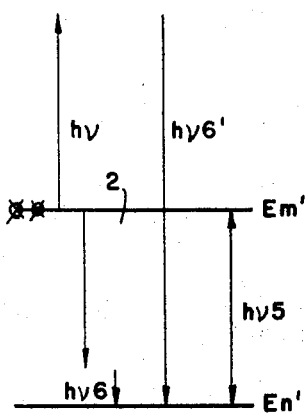
FIGS. 21, 22, 23, 24, 25 and 26 are energy level diagrams for a mode of operating a system of six components, as is the embodiment of FIG. 4.

The system represented by the energy-level diagrams of FIGS. 21 to 26 comprises a total of six crystals, being in this respect similar to the embodiment of FIG. 4. The six component crystal systems 1 to 6 are represented in respective FIGS. 21 to 26 in the same sequence by energy-level diagrams showing two energy states of the crystal oscillations. The component systems 1, 2, 3 and 4 consist, for example, of ion crystals of the same chemical composition, such as GaAs. The component system 2 according to FIG. 22 is subjected to deformation by external mechanical force resulting in an increase of the energy difference. The corresponding new energy states in this component system are denoted by $E_m'$ and $E_n'$.

Primary radiation is radiated into component system 1 (FIG. 21) and has a frequency coincident with the natural frequency of system 1 which corresponds to the energy difference $E_m-E_n$. Consequently the upper energy state $E_m$ is excited, as indicated by asterisks. The primary radiation $h\nu$ is also radiated into component system 2 (FIG. 22) which has a somewhat larger energy spacing in comparison with system 1, due to mechanical deformation. In system 2, therefore, there occurs a radiation of relatively low frequency $\nu_6$ which is radiated from system 2 back into system 1. This produces in system 1 (FIG. 21) a radiation $h\nu_5$ of the combination frequency $\nu_5$. The frequency $\nu_5$ is identical with the natural frequency of system 2 (FIG. 22). The radiation $h\nu_5$ therefore is radiated from system 1 into system 2 where it is completely absorbed, thus increasing the excitation of the state $E_m'$. Also produced in component system 2 is a combination radiation $h\nu_6'$ which is radiated as primary radiation into component system 3 (FIG. 23).

Figure 23:
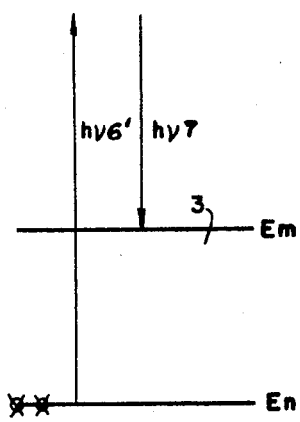
Figure 21:
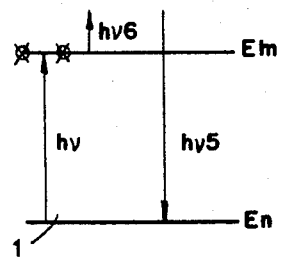
Figure 24:
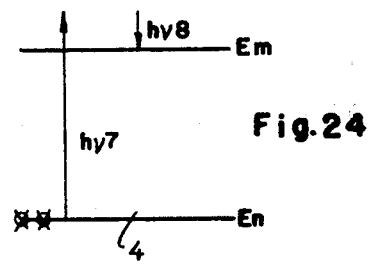

While according to FIGS. 21 to 22 the upper energy state is excited in each of component systems 1 and 2, this is not so in system 3 where according to FIG. 23 the lower energy state $E_n$ is excited. Due to radiation of $h\nu_6$ from system 2 into system 3 a new combination radiation $h\nu_7$ is produced in system 3. However, since system 3, in contrast to system 2, is not deformed but possesses its normal energy spacing, as does the system 1, the radiation $h\nu_7$ has a frequency identical with the natural frequency $\nu_5$ of component system 2.

The radiation $h\nu_7$ is radiated back into component system 2 where it modifies the excitation degree of the energy state $E_m'$. Mainly, however, the radiation $h\nu_7$ is radiated from system 3 into component system 4 (FIG. 24) in which the lower energy state $E_n$ is excited. The radiation $h\nu_8$ generated in the component system 4 coincides as to frequency with the radiation $h\nu_6$.

Figure 25:
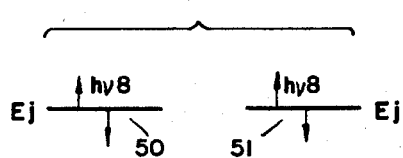
Figure 26:
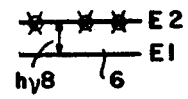

Aside from the mutually effective radiation of the energies $h\nu_8$ and $h\nu_6$ between the component systems 4 and 2, the radiation of frequency $\nu_8$ is also radiated into a component system 5 (FIG. 25) consisting of subsystems 50 and 51, and so forth. Here the frequency $\nu_8$ is coherently scattered at an excited crystal oscillation in its upper energy state $E_j$, and is converted in the subsystem to a coherent radiation field. Only two of the subsystems are represented in FIG. 25, although a larger number may be involved. The coherent radiation field in the subsystems 50, 51, and so forth is radiated into another component system 6 (FIG. 26) in which the energy difference $E_2-E_1$ of its spin conditions is adapted to the frequency $v_8$ to be amplified, either by suitable choice of the crystal substance or by mechanical deformation of the crystal lattice.

The upper energy level $E_2$ in component system 6 is excited so that now the radiation field of frequency $v_8$ can again be amplified. In some embodiments of such a system, the component system 6 according to FIG. 26 may be omitted.

The excitation of the individual component systems, as indicated, is essentially electrodynamic, the necessary natural oscillations in each component system being produced by combination frequencies of adjacent systems.

As explained above, one or more of the component systems may be constituted by piezoelectric crystals and the excitation of natural oscillations be effected by externally applied electric fields. In this manner, the example described with reference to FIGS. 21 and following, operates to convert a relatively high input frequency into a low-frequency output radiation, for example in the long-wave infrared or micro-wave region, which occurs with modified intensity in the subsystems of component 5 (FIG. 25) in form of a coherent radiation field and hence can be amplified and emitted to the outside of the system. The amplification is determined by the respective excitations in the component systems 1 to 5.

The component system 6 (FIG. 26) is not constituted by an ionic crystal but consists, for example, of a valence crystal doped with paramagnetic ions, such as doped silicon. However, in system 6, too, the distance between the energy states $E_1$ and $E_2$ may be modified by external deformation or by applying external electrical or magnetic fields, thus affording an adaptation or some selectivity of the desired amplification. The crystal of component system 6 may also be piezoelectric in which case the internal electrical field strength is applicable for modification or excitation of the energy states $E_2$ and $E_1$.

In the described systems, including the one exemplified by FIGS. 21 to 26, the excitation of one or more of the component systems may be effected with the aid of an ultrasonic oscillation generator. In contrast to oscillations produced by thermal excitation, waves generated ultrasonically possess predeterminable wave fronts of a desired direction at which there occurs reflection or scattering of radiation quantities produced in neighboring systems. For example, the component system 5 (FIG. 25) particularly may be subjected in this manner to oriented excitation, inclusive of its subsystems, and a reflection of the oscillations having the frequency $v_8$ can be utilized at these wave fronts in the radiation path.

It will be recognized from the embodiments illustrated and described that the electromagnetic radiation field is preferably confined to the total system comprised of several component systems and issues from, or into, the ambient space only at the input locality or output locality of the over-all system.

It will further be apparent from the described embodiments, such as those shown in FIGS. 1, 2 and 4, that it is preferable to have the entire multi-component system radiatively closed by reflective media, with the exception of the input and output localities for the radiation being amplified.

As a rule, the geometric shape of the over-all configuration and hence of the enclosing envelope or housing used for the multi-component system and constituted by reflective media, is adapted to the arrangement of the individual component systems required for a chosen selection of the oscillation modes or component oscillations to be utilized.

The above-mentioned reflective media which confine the radiation path preferably possess a layer structure, and the individual layers possess selective optical properties with respect to certain frequencies and relative to the polarization condition of the radiation components corresponding to these frequencies.

Multi-component crystal systems according to the invention are generally suitable for producing and amplifying electromagnetic radiation of selective frequencies or frequency bands that are not fixed by a given crystal. The use of such multi-component systems comprises radiation regions extending from micro-waves to the visible or ultraviolet region of the spectrum. In most cases, a given system according to the invention is designed and operative in a selected region only, for example for the purpose of generating and amplifying micro-waves. On the same principle, desired frequencies in the visible region of the spectrum may also be produced and amplified. Systems according to the invention are further suitable as amplifiers and/or frequency converters in cases where different respective component systems amplify relatively high and relatively low frequencies, as well as for use as multi-stage side-band amplifiers.

By virtue of the fact that the system according to the invention can be given small spacial dimensions and since the spectral region can be chosen, a system according to the invention is also suitable as a probe for radiation-therapeutical purposes as described above with reference to the embodiment of FIG. 4.

Another way of employing the invention is to provide a combination of several similar multi-component systems for increasing the intensity of given selected frequencies or frequency bands. Such a combination of several similiar systems may also be used for producing a mutual effect of the individual systems in such a manner that, for example, one system acts upon the other in a lower frequency band, whereas the other system acts upon the former in a higher frequency band, or vice versa. A given component system of one of the two over-all systems may then be used for issuing an amplified combination frequency. Combinations of a plurality of similar multi-component systems are also suitable as filters, such as low-pass or high-pass filters. A combination of a large number of similar systems having small geometric dimensions is suitable for use as picture or image converter.

To those skilled in the art it will be obvious upon a study of this disclosure, that my invention is amenable to a great variety of modifications and hence can be given embodiments other than particularly illustrated and described herein, without departing from the essential features of the invention and within the scope of the claims annexed hereto.

I claim:

1. A system for stimulated emission of electromagnetic radiation, comprising a source of primary electromagnetic radiation, resonant system components having respective crystals, said resonant system components and said source being positioned to provide a continuous path for passing radiation between said components, at least one of said components receiving said primary radiation from said source and having a natural frequency differing from the frequency of said primary radiation to produce combination-frequency radiation in said one component, another one of said components for amplifying said combination frequency radiation being located in said path for receiving said combination-frequency radiation, and means for exciting the crystals of said resonant system components to quantum mechanical oscilliatory energy states.

2. In a system for stimulated electromagnetic radiation according to claim 1, said source having a primary radiation frequency at which the resulting combination-frequency radiation comprises a frequency related to the natural frequency of another one of said system components in accordance with a ratio of integers.

3. In a system for stimulated electromagnetic radiation according to claim 1, said crystals of said system components comprising a crystal of semiconductor material.

4. In a system for stimulated electromagnetic radiation according to claim 1, said system components comprising a crystal doped with paramagnetic ions which determine the excited oscillatory energy states of said crystal.

5. In a system for stimulated electromagnetic radiation according to claim 1, said system components comprising a semiconducting ion crystal.

6. In a system for stimulated electromagnetic radiation according to claim 1, said system components comprising a crystal consisting of an $A^{III}B^{V}$ semiconductor compound.

7. In a system for stimulated electromagnetic radiation according to claim 1, said system components comprising a valence-bond crystal.

8. A system for stimulated emission of electromagnetic radiation, comprising a plurality of resonant system components having respective crystals, said resonant system components being positioned to provide a continuous radiation path for passing radiation between said component systems, a first one of said system components forming a source of primary radiation passing into a second one of said components and having a frequency different from the natural frequency of said second component to produce therein a combination-frequency radiation, a third one of said components receiving said combination-frequency radiation and having a natural frequency differing therefrom to produce another combination-frequency radiation, said system having outlet means for at least one of said combination-frequency radiations, and means for exciting the crystals of said resonant system components to quantum mechanical oscillatory energy states.

9. A system for stimulated emission of electromagnetic radiation according to claim 8, comprising reflector means disposed in said path so as to close it upon itself thereby repeatedly amplifying said combination-frequency radiation.

10. A system for stimulated emission of electromagnetic radiation according to claim 8, comprising reflector means providing a feedback from one of said components to another thereby repeatedly amplifying said combination-frequency radiation in the feedback-connected components.

11. In a system for stimulated electromagnetic radiation according to claim 8, one of said system components having at least one natural frequency corresponding to the combination-frequency radiation of a neighboring component for coherent scattering of said combination-frequency radiation.

12. In a system for stimulated electromagnetic radiation acording to claim 8, one of said system components having a natural frequency slightly different from that of the combination-frequency radiation received from a neighboring component for coherent scattering and amplification of said received radiation.

13. In a system for stimulated electromagnetic radiation according to claim 8, the crystal of at least one of said system components in said radiation path being transparent relative to the frequency range to be amplified and having exclusively normal dispersion in said frequency range 14. In a system for stimulated electromagnetic radiation according to claim 8, the crystal of at least one of said system components in said radiation path being reflective relative to the frequency range to be amplified and having abnormal dispersion in said frequency range.

15. In a system for stimulated electromagnetic radiation according to claim 8, at least one of said system components consisting of a thin layer.

16. A system for stimulated emission of electromagnetic radiation according to claim 8, comprising mechanical stressing means engaging one of said respective crystals for deforming its crystal lattice to thereby adjust its natural frequency.

17. A system for stimulated emission of electromagnetic radiation according to claim 8, comprising mechanical force transmitting means engaging one of said components for deforming it so as to modify its optical properties.

18. In a system for stimulated electromagnetic radiation according to claim 8, a plurality of said components having means for applying primary excitation from without the system to excite said oscillatory energy states in the respective crystals.

19. In a system for stimulated electromagnetic radiation according to claim 8, at least one of said system components having a natural frequency of coherent response to the combination-frequency radiation from a neighboring component, said one system component being excited to said energy states by a combination-frequency radiation radiated from another component of the system.

20. In a system for stimulated electromagnetic radiation according to claim 8, at least one of said system components having a natural frequency for coherent response to the combination-frequency radiation from a neighboring component, said one system component being ultrasonically excited.

21. In a system for stimulated electromagnetic radiation according to claim 8, at least one of said system components having a natural frequency for coherent response to the combination-frequency radiation from a neighboring component, said one system component being ultrasonically excited, and reflective isolating layers acoustically separating said latter component from neighboring components of the system.

22. In a system for stimulated electromagnetic radiation according to claim 8, at least one of said crystals being piezoelectric, and having static electric field means for electrically adjusting the natural frequency of the crystal.

23. In a system for stimulated electromagnetic radiation according to claim 8, one of said system components being permeable to combination-frequency radiation and forming the output stage of the system for issuing an amplified signal.

24. In a system stimulated electromagnetic radiation according to claim 8, one of said components forming the output stage of said system and being radiatively joined with a plurality of the other components to simultaneously receive combination-frequency radiation therefrom.

25. A system for stimulated emission of electromagnetic radiation according to claim 8, one of said components forming an input stage and another one forming an output stage of the system, said system having a radiation field communicating with the ambient space only through said input and output stages.

26. A system for stimulated emission of electromagnetic radiation according to claim 8, comprising in said radiation path between the crystals of two of said components a layer of frequency-selective optical properties.

27. In a system for stimulated electromagnetic radiation according to claim 14, said layer being a polarizing material.

28. In a system for stimulated electromagnetic radiation according to claim 26, said layer being a double-refracting material.

29. In a system for stimulated electromagnetic radiation according to claim 8, at least one of said crystals being piezoelectric and having electrodes for subjecting the crystal to an electric field.

30. In a system for stimulated electromagnetic radiation according to claim 29, said electrodes being supplied with alternating voltage for exciting the required oscillatory energy states.

31. A system for stimulated emission of electromagnetic radiation according to claim 8, comprising reflector means which confine radiation in said system to within said system except at said input and output stages.

32. In a system for stimulated electromagnetic radiation according to claim 31, said reflector means comprising layers of material having frequency-selective optical properties.

References Cited

FOREIGN PATENTS 1,185,720  1/1965  Germany.

OTHER REFERENCES

Eckhardt et al., "Physical Review Letters," Dec. 1, 1962, pp. 455–457 (copy in Scientific Library).

Kaminow, "IEEE Spectrum," April 1965, pp. 35–43. (Copy in Scientific Library.) 330–4.5.

ROY LAKE, *Primary Examiner.*

DARWIN R. HOSTETTER, *Assistant Examiner.*